(No Model.)
G. WESTINGHOUSE, Jr.
MEANS FOR DETECTING AND CLOSING LEAKS IN GAS MAINS.
No. 331,596. Patented Dec. 1, 1885.
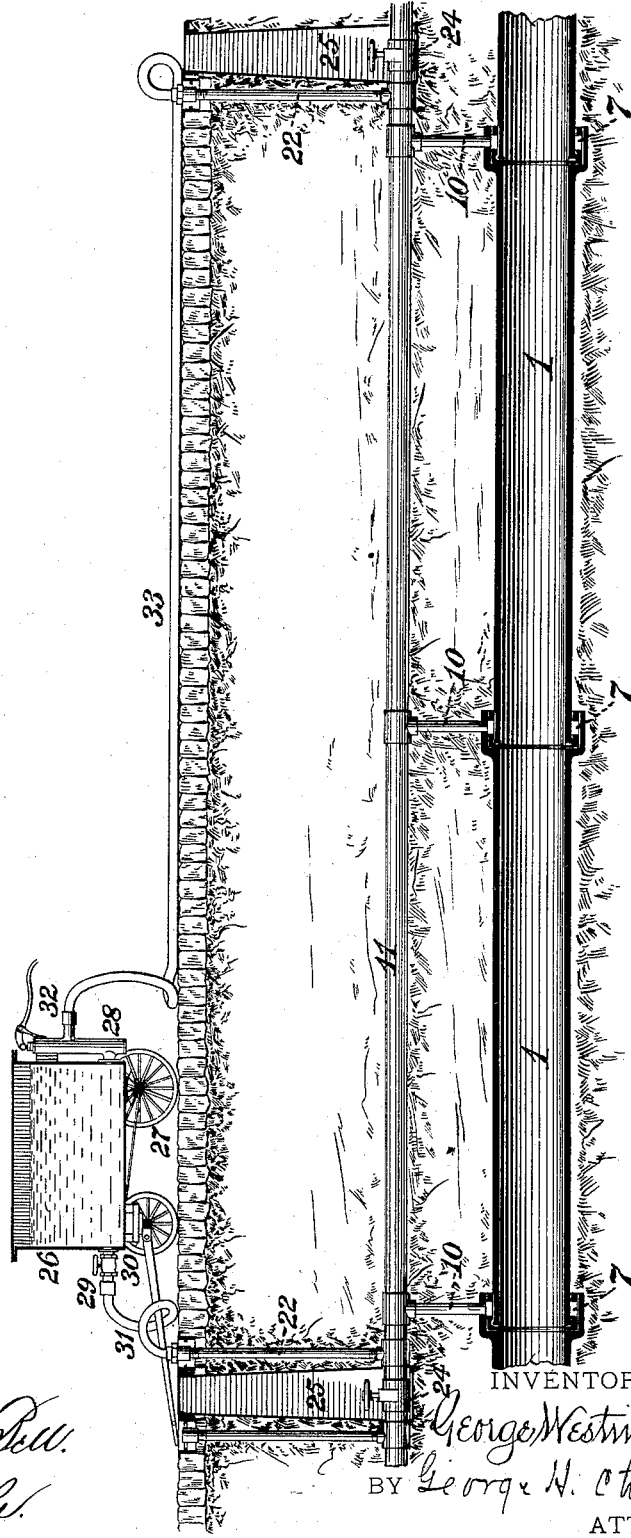
WITNESSES:
INVENTOR,
George Westinghouse, Jr.
BY George H. Christy
ATTORNEY.

United States Patent Office.

GEORGE WESTINGHOUSE, JR., OF PITTSBURG, PENNSYLVANIA.

MEANS FOR DETECTING AND CLOSING LEAKS IN GAS-MAINS.

SPECIFICATION forming part of Letters Patent No. 331,596, dated December 1, 1885.

Application filed November 2, 1885. Serial No. 181,582. (No model.)

*To all whom it may concern:*

Be it known that I, GEORGE WESTINGHOUSE, Jr., residing at Pittsburg, in the county of Allegheny and State of Pennsylvania, a citizen of the United States, have invented or discovered a certain new and useful Improvement in Means for Detecting and Closing Leaks in Gas-Mains, of which improvement the following is a specification.

In the accompanying drawing, which makes part of this specification, the figure is a view, partly in section and partly in elevation, of a portion of a main or pipe line and its accessories, illustrating the application of my invention.

The object of my invention is to enable the existence of leaks in the joints of a main for the conveyance of gas or other fluid to be readily detected, and, when discovered, to be closed with proper tightness to prevent the further escape of fluid.

To this end my invention, generally stated, consists in the combination of a pipe-line having its joints or couplings provided with internal chambers or receptacles adapted to receive fluid leaking from the connected pipe-sections, a supplemental or leakage line communicating with said chambers, and means for forcing, under pressure, a current of fluid or semi-fluid material of suitable character to set or harden in and close up a leak through any determined portion of the supplemental line and into the joint-chamber communicating therewith.

The improvement claimed is hereinafter fully set forth.

In the practice of my invention each of the joints or couplings of the main or line 1, through which gas or other fluid is conducted, is, as in my Letters Patent No. 319,364, dated June 2, 1885, provided with an internal chamber or receptacle, 7, which has a portion of its walls or boundaries formed by one or both of the sections of pipe connected by the joint in such manner that any gas leaking from either of said sections must pass into and through said chamber to gain egress from the main.

The particular form and location of the chambers 7 is immaterial, so long as they possess the capacity of intercepting leakage, as above indicated, and they may be either of the character illustrated in Letters Patent No. 319,364 or of any other appropriate construction, being, in the instance shown, formed within couplings of the bowl-and-spigot type by the addition of suitable gaskets and packing-rings. Each of the joint-chambers 7 of the main 1 is connected by a vent or escape pipe, 10, with a common supplemental or leakage line, 11, composed of sections of pipe of small diameter relatively to that of the main, and gates or valves 24 are located at suitable intervals in the length of the supplemental line 11, and inclosed in boxes or casings 25, so as to be conveniently accessible whenever desired. The valves 24, when closed, divide the line 11 into sections of any desired and determined length—as, say, three hundred feet, more or less—each of said sections being in communication, through the vent or escape pipes 10, with the several joints of the main lying within the distance between the terminals. A pipe, 22, which serves both as a detector and escape pipe and a passage for the circulation of cementing material, as presently to be described, leads from each of the sections or divisions of the supplemental main lying between two of the valves 24 at a point adjacent to each of the terminals of said section, said pipes extending to or above the level of the ground to such positions as to be readily accessible, and being provided with suitable removable caps or plugs on their upper ends. By the removal of one of said caps and the application of a light to the open end of the pipe the existence of a leak at any of the joints of the corresponding section of the main 1 will be at once detected, and, if desired, one or both of said caps may be provided with a waste or relief pipe to admit of the continuous escape of leaking gas at a suitable point of discharge.

In order to effect the closure of any leaks that may be detected at joints of the main 1 communicating with either of the sections of the supplemental main 11, I provide for forcing and circulating under pressure through said section and into the several joint-chambers 7 communicating therewith, at such times as may be required, any fluid or semi-fluid material having the capacity of setting or hardening in and thereby closing up any small opening or interstice through which leakage of fluid may or does take place—as, for example, rubber cement, varnish, red lead and oil, or other materials or compounds possessing the requisite sealing or cementing property. Such operation may be conveniently and effectively performed by the employment of a portable chamber or reservoir, 25, which, for convenience of transportation to and from any desired section of the line, may be mounted on wheels 27, and is provided with a force-pump, 28, of any suitable construction, and adapted to be actuated by manual or other power. The reservoir 25, which is tightly closed, is supplied with the cementing-fluid or semi-fluid material, which is inclosed in the reservoir under a pressure greater than of the gas or other fluid passing through the main 1, and is provided with a delivery-nozzle, 29, adapted to be connected to a hose or pipe, 31, leading to one of the pipes 22, and governed by a cock or valve, 30. A force-pump, 28, is connected to and communicates with the reservoir 26, and is adapted, by a nozzle or coupling-flange, 32, to be connected, through a hose or pipe, 33, with one of the detector and circulating pipes 22 of any section of the supplemetal line 11. In the event of a leak being discovered in the main 1, by the escape of gas upon the removal of the cap of one of the pipes 22 of a section of the line 11, the reservoir 26 is brought into proper position relatively to the section, and the valves 24 at the ends of the section being closed, the reservoir is connected therewith by coupling its nozzle 29 to the pipe 31, which is in turn coupled to one of the pipes 22 of the section, and connecting the nozzle 32 of the pump 28 with the pipe 22 at the opposite end of the section through the hose or pipe 33. The cock 30 being then opened, the pump 28 is operated to effect a circulation of the cementing material contained in the reservoir 26, through the connected section of the supplemental line 11 and into the chambers 7 of the main which communicate therewith. The pressure in the reservoir being, as before stated, higher than that in the main, the cementing material will be forced into the opening or openings in the joint or joints of the main through which the leakage has taken place, and, by setting or hardening therein, will close up such opening or openings and prevent further leakage. The cock 30 being then closed, the remainder of the cementing material is pumped out of the section, and the reservoir 26 and connecting-pipes 31 33 being disconnected, the caps are replaced on the pipes 22, and the line is left in condition for normal operation.

The section may be blown through or washed out by a circulation of water, if deemed necessary, subsequently to the circulation of the cementing material through it, in order to remove any deposit of said material from the line 11 and pipes 22.

While I have illustrated a pump as the means for circulating the cementing material, I do not limit myself to the use of such specific device, as it will be obvious that hydraulic pressure applied to the reservoir containing the material may likewise be employed to effect the desired circulation.

I claim herein as my invention—

1. The combination of a pipe line or main having chambers or receptacles at its joints or couplings adapted to receive fluid leaking from its connected sections, a supplemental or leakage line communicating with said joint-chambers and provided with valves or gates by which it may be divided into separate sections, and a device adapted to be connected at two points to a section of the supplemental line for the purpose of effecting a circulation of sealing or cementing material, under pressure, through said section and into the communicating joint-chambers of the main, substantially as set forth.

2. The combination of a pipe line or main having chambers at its joints or couplings, a supplemental or leakage line communicating with said joint-chambers and provided with valves or gates by which it may be divided into separate sections, pipes leading from each of said sections near its terminals to points at or accessible from the level of the ground, and removable caps or plugs closing said pipes, substantially as set forth.

3. The combination of a pipe line or main having chambers at its joints or couplings, a supplemental or leakage line communicating with said joint-chambers and provided with valves or gates by which it may be divided into separate sections, detector and circulating pipes leading from each of said sections near its terminals to points at or accessible from the level of the ground, a reservoir for holding fluid or semi-fluid sealing or cementing material under pressure, a circulating device communicating therewith, and pipes whereby the reservoir may be connected to the detector and circulating pipes of a section of the supplemental or leakage line, substantially as set forth.

In testimony whereof I have hereunto set my hand.

GEO. WESTINGHOUSE, JR.

Witnesses:
J. SNOWDEN BELL,
R. H. WHITTLESEY.